United States Patent
Chiba et al.

(10) Patent No.: US 12,493,039 B2
(45) Date of Patent: Dec. 9, 2025

(54) BIOMARKER FOR PREDICTING THE PROGNOSIS FOR AN ENDOMETRIAL CANCER PATIENT

(71) Applicant: FUKUSHIMA MEDICAL UNIVERSITY, Fukushima (JP)

(72) Inventors: Hideki Chiba, Fukushima (JP); Kotaro Sugimoto, Fukushima (JP)

(73) Assignee: FUKUSHIMA MEDICAL UNIVERSITY, Fukushima (JP)

( * ) Notice: Subject to any disclaimer, the term of this patent is extended or adjusted under 35 U.S.C. 154(b) by 1180 days.

(21) Appl. No.: 17/281,834

(22) PCT Filed: Mar. 25, 2019

(86) PCT No.: PCT/JP2019/012503
§ 371 (c)(1),
(2) Date: Mar. 31, 2021

(87) PCT Pub. No.: WO2020/075325
PCT Pub. Date: Apr. 16, 2020

(65) Prior Publication Data
US 2022/0018842 A1   Jan. 20, 2022

(30) Foreign Application Priority Data
Oct. 9, 2018   (JP) .................. 2018-191286

(51) Int. Cl.
*G01N 33/574*   (2006.01)
*C12Q 1/6886*   (2018.01)

(52) U.S. Cl.
CPC ..... *G01N 33/57442* (2013.01); *C12Q 1/6886* (2013.01); *C12Q 2600/158* (2013.01)

(58) Field of Classification Search
None
See application file for complete search history.

(56) References Cited

FOREIGN PATENT DOCUMENTS

| JP | 2013-510808 A | | 3/2013 | |
|---|---|---|---|---|
| WO | WO 2011057788 | * | 11/2010 | ............. C07K 16/28 |
| WO | 2011/057788 A1 | | 5/2011 | |
| WO | WO 2013137475 | * | 3/2013 | ............. G01N 33/68 |

OTHER PUBLICATIONS

Evans-Metcalf, ER; et al., "Profile of women 45 years of age and younger with endometrial cancer", Obstet Gynecol. 1998; vol. 91(3), pp. 349-354.
Duska, LR; et al., "Endometrial cancer in women 40 years old or younger", Gynecol Oncol, 2001; vol. 83(2), pp. 388-393.
Ferlay, J; et al., "Cancer incidence and mortality patterns in Europe: estimates for 40 countries in 2012", Eur J Cancer. 2013; vol. 49(6), pp. 1374-1403.
Morice, P; et al.,"Endometrial cancer", Lancet. 2016; vol. 387(10023), pp. 1094-1108.
Creasman, WT; et al., "Carcinoma of the corpus uteri. FIGO 26th Annual Report on the Results of Treatment in Gynecological Cancer", Int J Gynaecol Obstet. 2006; vol. 95 Suppl 1, pp. S105-43.
Kojima, M., "The high expression of claudin-6 is a poor prognostic factor in uterine endometrial carcinoma", Int. J Gynecological cancer 2018; vol. 28 Suppl 2, p. 1113.
ISA/JP, PCT International Search Report which was issued in connection with PCT/JP2019/012503 and mailed Jun. 11, 2019, with its English translation (5 pages).

* cited by examiner

*Primary Examiner* — Ann Montgomery
(74) *Attorney, Agent, or Firm* — Lucas & Mercanti, LLP

(57) ABSTRACT

An objective of the present invention is to provide a novel biomarker for predicting the prognosis of an endometrial cancer patient. A biomarker that comprises a claudin 6 protein or a peptide fragment thereof, or a transcription product of a claudin 6 gene or a nucleic acid fragment thereof is provided so as to predict the prognosis of an endometrial cancer patient.

5 Claims, 6 Drawing Sheets
Specification includes a Sequence Listing.

A

B

SEQUENCE LISTING

```
<160> NUMBER OF SEQ ID NOS: 10

<210> SEQ ID NO 1
<211> LENGTH: 220
<212> TYPE: PRT
<213> ORGANISM: Homo sapiens

<400> SEQUENCE: 1

Met Ala Ser Ala Gly Met Gln Ile Leu Gly Val Val Leu Thr Leu Leu
1               5                   10                  15

Gly Trp Val Asn Gly Leu Val Ser Cys Ala Leu Pro Met Trp Lys Val
            20                  25                  30

Thr Ala Phe Ile Gly Asn Ser Ile Val Val Ala Gln Val Val Trp Glu
        35                  40                  45

Gly Leu Trp Met Ser Cys Val Val Gln Ser Thr Gly Gln Met Gln Cys
    50                  55                  60

Lys Val Tyr Asp Ser Leu Leu Ala Leu Pro Gln Asp Leu Gln Ala Ala
65                  70                  75                  80

Arg Ala Leu Cys Val Ile Ala Leu Leu Val Ala Leu Phe Gly Leu Leu
                85                  90                  95

Val Tyr Leu Ala Gly Ala Lys Cys Thr Thr Cys Val Glu Glu Lys Asp
            100                 105                 110

Ser Lys Ala Arg Leu Val Leu Thr Ser Gly Ile Val Phe Val Ile Ser
        115                 120                 125

Gly Val Leu Thr Leu Ile Pro Val Cys Trp Thr Ala His Ala Ile Ile
    130                 135                 140

Arg Asp Phe Tyr Asn Pro Leu Val Ala Glu Ala Gln Lys Arg Glu Leu
145                 150                 155                 160

Gly Ala Ser Leu Tyr Leu Gly Trp Ala Ala Ser Gly Leu Leu Leu Leu
```

```
                165                 170                 175
Gly Gly Gly Leu Leu Cys Cys Thr Cys Pro Ser Gly Gly Ser Gln Gly
            180                 185                 190

Pro Ser His Tyr Met Ala Arg Tyr Ser Thr Ser Ala Pro Ala Ile Ser
        195                 200                 205

Arg Gly Pro Ser Glu Tyr Pro Thr Lys Asn Tyr Val
    210                 215                 220

<210> SEQ ID NO 2
<211> LENGTH: 663
<212> TYPE: DNA
<213> ORGANISM: Homo sapiens

<400> SEQUENCE: 2
atggcctctg ccggaatgca gatcctggga gtcgtcctga cactgctggg ctgggtgaat      60
ggcctggtct cctgtgccct gcccatgtgg aaggtgaccg ctttcatcgg caacagcatc     120
gtggtggccc aggtggtgtg ggagggcctg tggatgtcct gcgtggtgca gagcaccggc     180
cagatgcagt gcaaggtgta cgactcactg ctggcgctgc acaggacct gcaggctgca      240 cgtgccctct gtgtcatcgc cctccttgtg gccctgttcg gcttgctggt ctaccttgct     300
ggggccaagt gtaccacctg tgtggaggag aaggattcca aggcccgcct ggtgctcacc     360
tctgggattg tctttgtcat tcagggggtc ctgacgctaa tccccgtgtg ctggacggcg     420
catgccatca tccgggactt ctataacccc ctggtggctg aggcccaaaa gcgggagctg     480
ggggcctccc tctacttggg ctgggcggcc tcaggccttt tgttgctggg tggggggttg     540
ctgtgctgca cttgcccctc ggggggggtcc cagggcccca gccattacat ggcccgctac     600
tcaacatctg ccctgccat ctctcggggg ccctctgagt accctaccaa gaattacgtc     660
tga                                                                   663

<210> SEQ ID NO 3
<211> LENGTH: 10
<212> TYPE: PRT
<213> ORGANISM: Rattus norvegicus

<400> SEQUENCE: 3

Gly Phe Asn Phe Asn Asp Tyr Phe Met Asn
1               5                   10

<210> SEQ ID NO 4
<211> LENGTH: 20
<212> TYPE: PRT
<213> ORGANISM: Rattus norvegicus

<400> SEQUENCE: 4

Val Ala Gln Ile Arg Asn Lys Asn Tyr Asn Tyr Ala Thr Tyr Tyr Ala
1               5                   10                  15

Glu Ser Leu Glu
            20

<210> SEQ ID NO 5
<211> LENGTH: 3
<212> TYPE: PRT
<213> ORGANISM: Rattus norvegicus

<400> SEQUENCE: 5

Gly Ala Tyr
1
```

<210> SEQ ID NO 6
<211> LENGTH: 114
<212> TYPE: PRT
<213> ORGANISM: Rattus norvegicus

<400> SEQUENCE: 6

Glu Val Lys Leu Val Glu Thr Gly Gly Gly Leu Val Lys Pro Gly Gly
1               5                   10                  15

Ser Leu Arg Leu Ser Cys Ala Thr Ser Gly Phe Asn Phe Asn Asp Tyr
            20                  25                  30

Phe Met Asn Trp Val Arg Gln Ala Pro Gly Lys Gly Leu Glu Trp Val
        35                  40                  45

Ala Gln Ile Arg Asn Lys Asn Tyr Asn Tyr Ala Thr Tyr Tyr Ala Glu
    50                  55                  60

Ser Leu Glu Gly Arg Val Thr Ile Ser Arg Asp Asp Ser Lys Ser Ser
65                  70                  75                  80

Val Tyr Leu Gln Val Ser Ser Leu Arg Ala Glu Asp Thr Ala Ile Tyr
                85                  90                  95

Tyr Cys Thr Arg Gly Ala Tyr Trp Gly Gln Gly Val Met Val Thr Val
            100                 105                 110

Ser Ser

<210> SEQ ID NO 7
<211> LENGTH: 11
<212> TYPE: PRT
<213> ORGANISM: Rattus norvegicus

<400> SEQUENCE: 7

Arg Ala Ser Gln Asn Ile Asn Lys Tyr Leu Asp
1               5                   10

<210> SEQ ID NO 8
<211> LENGTH: 7
<212> TYPE: PRT
<213> ORGANISM: Rattus norvegicus

<400> SEQUENCE: 8

Asp Thr Asn Asn Leu His Ala
1               5

<210> SEQ ID NO 9
<211> LENGTH: 9
<212> TYPE: PRT
<213> ORGANISM: Rattus norvegicus

<400> SEQUENCE: 9

Leu Gln Arg Asn Ser Trp Pro Tyr Thr
1               5

<210> SEQ ID NO 10
<211> LENGTH: 107
<212> TYPE: PRT
<213> ORGANISM: Rattus norvegicus

<400> SEQUENCE: 10

Asp Ile Val Met Thr Gln Ser Pro Ser Phe Leu Ser Ala Ser Val Gly
1               5                   10                  15

Glu Arg Val Thr Leu Ser Cys Arg Ala Ser Gln Asn Ile Asn Lys Tyr
            20                  25                  30

Leu Asp Trp Tyr Gln Gln Lys Leu Gly Glu Ala Pro Lys Leu Leu Ile

-continued

```
            35                  40                  45
Tyr Asp Thr Asn Asn Leu His Ala Gly Ile Pro Ser Arg Phe Ser Gly
    50                  55                  60

Ser Gly Ser Gly Thr Asp Tyr Thr Leu Thr Ile Ser Ser Leu Gln Pro
65                  70                  75                  80

Glu Asp Val Ala Thr Tyr Phe Cys Leu Gln Arg Asn Ser Trp Pro Tyr
                85                  90                  95

Thr Phe Gly Ala Gly Thr Lys Leu Glu Leu Lys
                100                 105
```

BIOMARKER FOR PREDICTING THE PROGNOSIS FOR AN ENDOMETRIAL CANCER PATIENT

CROSS-REFERENCE TO RELATED APPLICATIONS

This application is a 371 of PCT/JP2019/012503, filed Mar. 25, 2019, which claims the benefit of Japanese Patent Application No. 2018-191286, filed Oct. 9, 2018.

TECHNICAL FIELD

The present invention relates to a biomarker for predicting the prognosis of an endometrial cancer patient.

BACKGROUND ART

Endometrial cancer is the most common gynecologic cancer in developed countries. Conventionally, endometrial cancer has been considered to be a cancer that occurs after menopause, but in recent years, the increasing number of cases have been diagnosed before menopause (Non-patent Literatures 1 and 2), and the annually predicted disease number has been increasing year by year (Non-patent Literature 3).

The main risk factor for endometrial cancer is long-term exposure to estrogen, but it is also known to be related to aging, obesity, and nulliparity (Non-Patent Literature 4). Endometrial cancer exhibits symptoms such as irregular genital bleeding from the early stage and is often diagnosed as early stage cancer. Therefore, although it is a malignant tumor with a relatively good postoperative prognosis, there are many cases of poor prognosis with high invasion, metastasis, and recurrence. For example, the 5-year survival rates for stages III and IV of the progression classification of endometrial cancer proposed by the International Federation of Gynecology and Obstetrics (FIGO) are only 57-66% and 20-26%, respectively (Non-Patent Literature 5). It is also known that chemotherapies mainly using platinum formulation, which are generally adopted for inoperable case, case with recurrence, and metastasis, are only successful temporarily and most of them recur. Therefore, there is a need for the development of a therapeutic method useful as a second line for chemotherapy-resistant cases and recurrent cases, and various cytocidal agents and molecular-targeted agents have been tried until today, but their therapeutic effects are limited.

In the above situation, when affected with endometrial cancer, it is extremely important to accurately predict whether the affected endometrial cancer is a type with a favorable prognosis or a type with a poor prognosis with high invasion, metastasis, recurrence, for disease control, alerting, prevention of recurrence, and early response at the time of recurrence.

CITATION LIST

Non-Patent Literature

Non Patent Literature 1: Evans-Metcalf et al., 1998, Obstet Gynecol., 91: 349-354.
Non Patent Literature 2: Duska et al., 2001, Gynecol. Oncol., 83: 388-393.
Non Patent Literature 3: Ferlay et al., 2013. Eur. J. Cancer, 49: 1374-1403.
Non Patent Literature 4: Morice et al., 2016, Endometrial cancer. Lancet. 387: 1094-1108.
Non Patent Literature 5: Creasman et al., 2006, Int J Gynaecol., 95 Suppl 1: S105-43.

SUMMARY OF INVENTION

Technical Problem

An object of the present invention is to provide a novel biomarker for predicting the prognosis of an endometrial cancer patient.

Solution to Problem

In order to solve the above problems, the present inventors have precisely analyzed the claudin 6 protein highly expressed in endometrial cancer tissue specimens and revealed its clinicopathologic significance.

Claudin (hereinafter, often referred to as "CLDN" in the present specification) protein is known as a transmembrane molecule essential for the formation of tight-binding strands (Furuse et al., 1998a, 1998b), and that 27 types or more of them form a family and show a tissue- and cell-specific expression pattern (Furuse and Tsukita, 2006; Chiba et. al., 2008; Gunzel and Yu, 2013). It has been suggested that the C-terminal intracellular domain of the CLDN protein may be coupled to various signaling molecules (McCrea et al., 2009). However, direct evidence showing that CLDN protein activates an intracellular signal and its molecular mechanism are yet to be shown (Cavallaro and Dejana, 2011).

Claudin 6 (CLDN6) protein is strongly expressed in the endoderm cell lineage in embryonic stage, while it is rarely expressed at the protein level in adult normal tissues, which is a unique characteristic not found in other members of the claudin family (Kubota et al., 2001; Turksen and Troy, 2001; Chiba et al., 2003; Anderson et al., 2008). In addition, CLDN6 protein is revealed to be strongly expressed in the process of epithelial differentiation induction in its earliest phase, and to function as a trigger for epithelial differentiation in mouse F9 stem cells and mouse embryonic stem (ES) cells (Kubota et al., 2001: Chiba et al., 2003: Satohisa et al., 2005: Sugimoto et al., 2013). The CLDN6 protein is known to be overexpressed in seminoma, embryonal carcinoma, and yolk sac tumor with high probability among germ cell tumors (Ushiku et al., 2012). As a result of examination using a tissue microarray, it was also reported that CLDN6 protein was overexpressed in some cases of gastric adenocarcinoma, lung adenocarcinoma, ovarian cancer, and endometrial cancer (Ushiku et al., 2012). However, the biological significance of the high expression of CLDN6 protein in these cancers was completely unknown.

The inventors of the present invention have conducted extensive studies based on the above technical background and have found that the highly expressed CLDN6 protein is a strong poor prognosis factor in uterine body cancer even more than distant metastasis. The present invention is based on the research results, and provides the following.

(1) A biomarker for predicting the prognosis of an endometrial cancer patient, consisting of a CLDN6 protein or a peptide fragment thereof, or a CLDN6 gene transcription product or a nucleic acid fragment thereof.

(2) The biomarker according to (1), wherein the CLDN6 protein is any one of the following proteins (a) to (c):

(a) a protein having the amino acid sequence according to SEQ ID NO: 1;

(b) a protein having an amino acid sequence according to SEQ ID NO: 1 with addition(s), deletion(s) or substitution(s) of one or plural amino acids;

(c) a protein having an amino acid sequence with 90% or more amino acid identity with respect to the amino acid sequence according to SEQ ID NO: 1.

(3) The biomarker according to (1) or (2), wherein the CLDN6 gene encodes the CLDN6 protein according to (2).

(4) The biomarker according to (1), wherein the CLDN6 gene is any one of the following polynucleotides (i) to (iv):
(i) a polynucleotide having nucleotide sequence according to SEQ ID NO: 2;
(ii) a polynucleotide having the nucleotide sequence according to SEQ ID NO: 2 with addition(s), deletion(s) or substitution(s) of one or plural bases;
(iii) a polynucleotide having a nucleotide sequence with 90% or more base identity with respect to the nucleotide sequence according to SEQ ID NO: 2
(iv) a polynucleotide having a nucleotide sequence that hybridizes with a nucleotide sequence complementary to any nucleotide sequence according to SEQ ID NO: 2 in a high stringent condition.

(5) Use of the biomarker according to any one of (1) to (4) for predicting the prognosis of an endometrial cancer patient.

(6) A method for predicting the prognosis of an endometrial cancer patient, comprising: the measurement step of measuring the amount of the biomarker according to any one of (1) to (4) comprised in a unit amount of a sample obtained from an endometrial cancer patient, so as to obtain the measurement value, and the determination step of determining the quality of the prognosis of the endometrial cancer patient based on the above, wherein, the determination step comprises determining the prognosis of the endometrial cancer patient to be poor, when the measurement value obtained in the measurement step is equal to or greater than a predetermined value.

(7) The method according to (6), wherein the sample comprises endometrial cancer tissue or endometrial cancer cells.

(8) The method according to (6) or (7), wherein the amount of the biomarker is measured using a binding molecule that specifically binds to the biomarker.

(9) The method according to (8), wherein the binding molecule is an antibody or a nucleic acid aptamer.

(10) The method according to (9), wherein the antibody is an anti-claudin 6 antibody.

(11) The method according to paragraph 10, wherein the anti-claudin 6 antibody is the anti-claudin 6 antibody comprises: CDR1, CDR2 and CDR3 of the heavy chain having the amino acid sequences according to SEQ ID NOs: 3, 4 and 5, respectively, and CDR1, CDR2 and CDR3 of the light chain having the amino acid sequences according to SEQ ID NOs: 7, 8 and 9, respectively.

(12) The method according to (11), wherein the anti-claudin 6 antibody comprises variable regions of the heavy chain and the light chain comprising the amino acid sequences according to SEQ ID NOs: 6 and 10, respectively.

(13) A kit for predicting the prognosis of an endometrial cancer patient, comprising a reagent for measuring the amount of the biomarker according to any one of (1) to (4).

(14) The kit according to paragraph 8, wherein the reagent comprises one or more selected from the group consisting of an anti-CLDN6 antibody, a fragment of an anti-CLDN6 antibody with a binding ability to a CLDN6 protein, a CLDN6 binding aptamer, and a primer pair that is capable of binding to a sense strand or an antisense strand of CLDN6 mRNA, and of specifically amplifying all or a part of the mRNA region.

(15) The kit according to (14), wherein the anti-claudin 6 antibody has CDR1, CDR2 and CDR3 of the heavy chain having an amino acid sequence according to SEQ ID NOs: 3, 4 and 5, respectively, and CDR1, CDR2 and CDR3 of the light chain having the amino acid sequences according to SEQ ID NOs: 7, 8 and 9, respectively.

The present specification comprises the contents disclosed in Japanese Patent Application No. 2018-191286, on which the priority of the present application is based.

Advantageous Effects of Invention

According to the biomarker for predicting the prognosis of an endometrial cancer patient and method for predicting the prognosis of an endometrial cancer patient of the present invention, based on the amount of the biomarker in cancer cells or cancer tissues such as collected by surgery from an endometrial cancer patient, it is possible to predict whether the cancer patient has a good prognosis or a poor prognosis.

DESCRIPTION OF EMBODIMENTS

Figure 1:
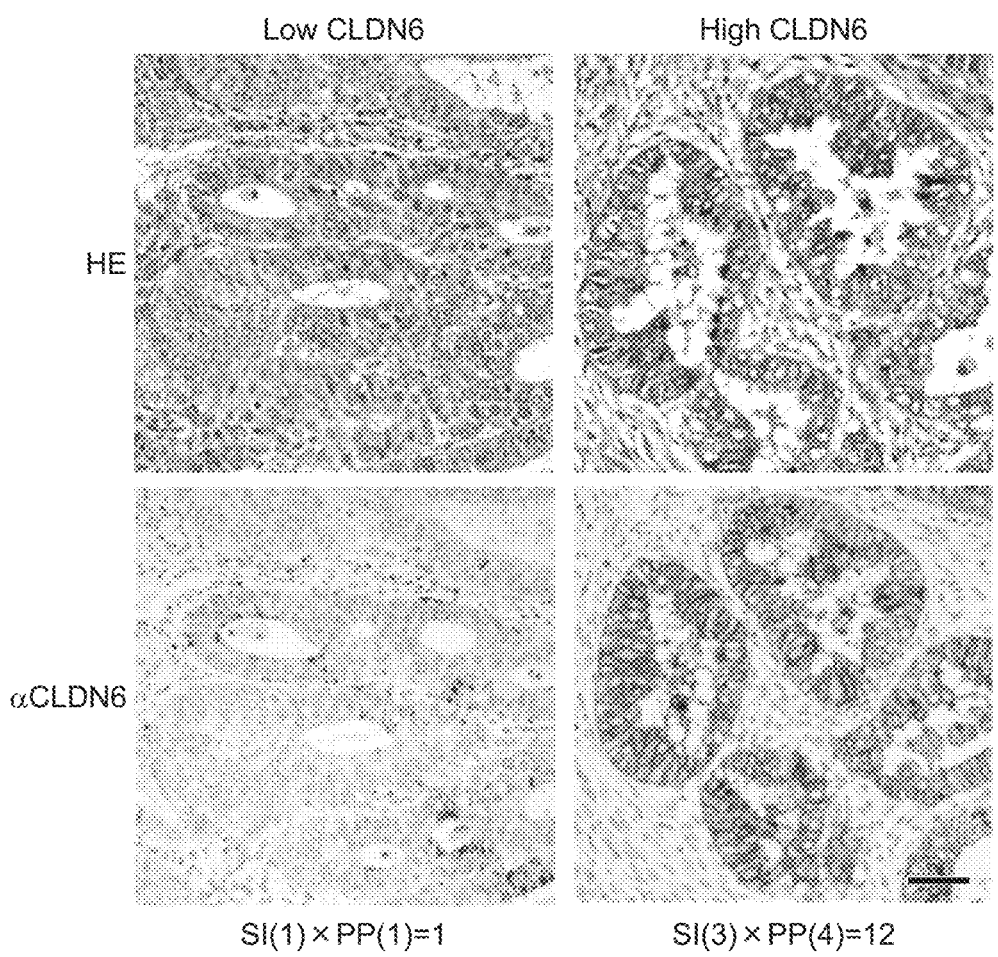
FIG. 1 shows immunohistochemical staining using an anti-CLDN6 polyclonal antibody showing the expression of CLDN6 protein collected by endometrial cancer surgery. HE indicates hematoxylin/eosin staining, and αCLDN6 indicates anti-CLDN6 antibody. Bar=50 μm.

1. Biomarker for the Prognosis of an Endometrial Cancer Patient 1-1. Overview

The first aspect of the present invention is a biomarker that predicts the prognosis of an endometrial cancer patient.

The biomarker of the present invention consists of claudin 6 (CLDN6) protein or a gene transcript encoding the same. According to the biomarker of the present invention, it is possible to predict whether the postoperative prognosis is good or poor depending on the expression level.

1-2. Definitions

The term "endometrial cancer" as used herein refers to a cancer that is caused in the endometrium of the uterine body and is also called "endometrial cancer." As described above, it is known that many cases of endometrial cancer have a good prognosis, but some have a poor prognosis.

The term "prognosis" as used herein refers to the future prospect of a patient's medical course or disease after treatment, particularly after surgery. For example, if the prognosis is good, it means that the prospect of the cure of the disease is good, and the life prognosis, that is, the prognostic survival rate is also high. On the contrary, when the prognosis is poor, it means that the therapeutic effect is not observed, the disease is exacerbated, the disease recurs, or the life prognosis is low. In the present invention, since the target disease is endometrial cancer, poor prognosis comprises recurrence, cancer progression due to invasion or metastasis of cancer cells, reduction in survival rate, and the like.

A "biomarker" refers to a biological indicator, the presence or concentration of which indicates the presence, change, progression of a disease, or degree of therapeutic effect comprising in-vivo substance such as a peptide (including protein) or a nucleic acid (including a gene or a transcription product thereof) present in cells, tissues, or body fluids. The biomarker of the present specification is a biomarker capable of predicting the prognosis of endometrial cancer based on the expression level.

1-3. Constitution

The biomarker for prognosis of an endometrial cancer patient of the present invention comprises a CLDN6 protein or a peptide fragment thereof, or a transcription product of a CLDN6 gene or a nucleic acid fragment thereof.

(1) Claudin 6 Protein or Peptide Fragment Thereof

"Claudin 6 Protein: CLDN6" is a transmembrane protein having an N-terminal extracellularly and a C-terminal intracellularly, and contributes to the formation of tight-binding strands. Unlike other members of CLDN family, as mentioned above, it is strongly expressed only in the endoderm cell lineage in the embryonic stage, and almost no expression at the protein level is observed in adult normal tissues (Kubota et al., 2001; Turksen and Troy, 2001; Chiba et al., 2003; Anderson et al., 2008). In the present specification, the organism species from which CLDN6 is derived comprises, for example, but is not limited to, human CLDN6 protein having the amino acid sequence according to SEQ ID NO: 1. A human CLDN6 variant and a human CLDN6 ortholog of another species having a functionally equivalent activity to the human CLDN6 protein according to SEQ ID NO: 1 are also applicable. For example, a protein having the amino acid sequence according to SEQ ID NO: 1 with addition(s), deletion(s), or substitution(s) of one or plural amino acids, or a protein having 90% or more, 91% or more, 92% or more, 93% or more, 94% or more, 95% or more, 96% or more, 97% or more, 98% or more, or 99% or more, and less than 100% amino acid identity with respect to the amino acid sequence according to SEQ ID NO: 1. The term "plural" as used herein refers to, for example, 2 to 20, 2 to 15, 2 to 10, 2 to 7, 2 to 5, 2 to 4, or 2 to 3. Additionally, for amino acid substitution, the conservative amino acid substitution is desirable. The "conservative amino acid substitution" refers to a substitution between amino acids having similar properties such as charge, side chain, polarity and aromaticity Amino acids having similar properties may be classified as, for example, basic amino acids (arginine, lysine, histidine), acidic amino acids (aspartic acid, glutamic acid), uncharged polar amino acids (glycine, asparagine, glutamine, serine, threonine, cysteine, tyrosine), non-polar Amino acids (leucine, isoleucine, alanine, valine, proline, phenylalanine, tryptophan, methionine), branched chain amino acids (leucine, valine, isoleucine), aromatic amino acids (phenylalanine, tyrosine, tryptophan, histidine), and the like.

As used herein, the term "amino acid identity" refers to the percentage (%) of the number of identical amino acid residues in the two amino acid sequences out of total number of amino acid residues of human CLDN6 protein having amino acid sequence according to SEQ ID NO: 1 when two amino acid sequences are aligned by introducing a gap if necessary so that the degree of amino acid match between the both sequences being maximized. The amino acid identity may be calculated using a protein search system based on BLAST or FASTA.

As used herein, the term "peptide fragment thereof" refers to a partial fragment of the CLDN6 protein. For example, a peptide fragment of the human CLDN6 protein according to SEQ ID NO: 1 may be comprised. The amino acid length of the peptide fragment is not particularly limited. For example, it may be 50 amino acids or more and 219 amino acids or less, or 100 amino acids or more and 219 amino acids or less.

In the present specification, the CLDN6 protein and peptide fragments thereof are often referred to as "CLDN6 protein, and the like."

(2) Transcription product of claudin 6 gene or nucleic acid fragment thereof.

"Claudin 6 gene (CLDN6 gene)" is a gene encoding the CLDN6 protein. A specific example of the CLDN6 gene comprises a human CLDN6 gene encoding a human CLDN6 protein having the amino acid sequence according to SEQ ID NO: 1. More specifically, it is a polynucleotide having the nucleotide sequence according to SEQ ID NO: 2.

Additionally, it comprises a polynucleotide encoding a CLDN6 ortholog of another species or a CLDN6 variant having a functionally equivalent activity to the human CLDN6 protein encoded by the human CLDN6 gene according to SEQ ID NO: 2. Specifically, it comprises a polynucleotide having the nucleotide sequence according to SEQ ID NO: 2 with addition(s), deletion(s), or substitution (s) of one or plural nucleotides, or a polynucleotide having 90%, 95% or more, 96% or more, 97% or more, 98% or more, or 99% or more and less than 100% base identity with respect to the amino acid sequence according to SEQ ID NO: 2. Furthermore, a polynucleotide having a nucleotide sequence that hybridizes under high stringent conditions with a nucleic acid fragment having a part of the nucleotide sequence complementary to the nucleotide sequence according to SEQ ID NO: 2, and encoding a protein having an activity that is functionally equivalent to CLDN6.

As used herein, the term "base identity" refers to the percentage (%) of the number of identical bases in the two nucleotide sequences out of total number of bases of CLDN6 gene having nucleotide sequence according to SEQ ID NO: 2 when two nucleotide sequences are aligned by introducing a gap if necessary so that the degree of base match between the both sequences being maximized.

As used herein, the term "hybridize under the condition of high stringency" refers to performing hybridization and washing under the condition of low salt concentration and/or high temperature. For example, incubating with probe at 65° C. to 68° C. in presence of 6×SSC, 5×Denhardt's reagent, 0.5% SDS, 100 μg/mL denatured fragmented salmon sperm DNA, followed by washing starting with washing solution comprising 2×SSC, 0.1% SDS and at room temperature, then the salt concentration in the washing solution is lowered to 0.1×SSC, and the temperature is raised to 68° C., until no background signal being detected. Regarding the conditions for highly stringent hybridization, reference can be made to Green, M. R. and Sambrook, J., 2012, Molecular Cloning: A Laboratory Manual Fourth Ed., Cold Spring Harbor Laboratory Press, Cold Spring Harbor, New York.

The information for the CLDN6 gene nucleotide sequence may be searched from public databases (GenBank, EMBL, DDBJ). For example, it is also possible to search for a gene with high base identity from a database and obtain it based on the known nucleotide sequence information of the CLDN6 gene according to SEQ ID NO: 2.

"CLDN6 gene transcript" means CLDN6 mRNA. The mRNA may be a mRNA precursor (pre-mRNA) or a mature mRNA. Usually, since the mRNA precursor is immediately spliced in the nucleus to be matured, being a mature mRNA, the CLDN6 gene transcript for the biomarker according to the first aspect of the present invention is substantially CLDN6 mature mRNA.

As used herein, the term "the nucleic acid fragment thereof" refers to a partial fragment of CLDN6 mRNA. The nucleotide length of the nucleic acid fragment is not particularly limited, but the lower limit may be the length with which the CLDN6 mRNA fragment in the sample being detectable as a CLDN6 mRNA fragment. For example, 100 bases or more, preferably 200 bases or more, more preferably 400 bases or more, or 600 bases or more may be comprised. On the other hand, the upper limit is one base shorter than that of the full-length polynucleotide of CLDN6 mRNA. In the present specification, CLDN6 mRNA and its nucleic acid fragments are collectively referred to as "CLDN6 mRNA, and the like."

2. Method for Predicting the Prognosis of an Endometrial Cancer Patient

2-1. Overview

A second aspect of the invention is a method for predicting the prognosis of an endometrial cancer patient. In the method of this aspect, the prognosis of an endometrial cancer patient is predicted based on the amount of the biomarker according to the first aspect comprised in a unit amount of a sample obtained from the endometrial cancer patient. According to this method, if the prognosis of the endometrial cancer patient is predicted to be poor, for example, it is possible to detect the presence or absence of metastasis and invasion, and to find recurrence at its early stage by performing prognosis observation and frequent examination after surgery on the patient.

2-2. Method

The method for predicting prognosis of an endometrial cancer patient of the present invention comprises (1) measurement step and (2) determination step as essential steps. Each step is specifically described as follows.

(1) Measurement Step

The "measuring step" is a step of measuring the amount of the biomarker according to the first aspect contained per unit amount in a sample obtained from a subject and obtaining the measured value.

The term "subject" as used herein refers to a woman with a history of endometrial cancer and after endometrial cancer surgery to whom each aspect of the present invention is applied. It may be any age of woman who meets the requirements for being a subject. Further, the period of time after the surgery for performing this step is not limited. It may be performed immediately after the surgery, or, as long as the sample remains, it may be performed several years after the surgery.

As used herein, the "sample" refers to a biological sample collected from the subject and used for the method for predicting the prognosis of endometrial cancer according to this embodiment. For example, it comprises tissues and cells. The "tissue" and "cells" referred to herein are tissues and cells derived from a subject's cancer tissue or uterus tissue, particularly the endometrium tissue comprising cancer cells. Specifically, it is a specimen excised by surgery, more specifically, a tissue or cell of a uterine body of a subject, or a tissue or cell of a uterine body collected by biopsy. Collection of the sample may be obtaining by surgery or surgical removal by biopsy, as described above. The sample may be prepared and processed as needed so that the biomarker of the first aspect can be measured. For example, if the sample is a tissue or a cell, homogenization, cell lysis, removal of contaminants by centrifugation or filtration, addition of a protease inhibitor and the like may be comprised. The details of these processes are described in Green, M R and Sambrook, J., 2012, Molecular Cloning: A Laboratory Manual Fourth Ed., Cold Spring Harbor Laboratory, Press, Cold Spring Harbor, New York, for your reference.

As used herein, the term "unit amount" refers to an amount per unit which is predetermined by the volume or the weight. Further, in the case of a section sample, the unit amount may be the area. The unit amount may be, but is not limited to, equal to or more than the measurable amount of the biomarker according to the first aspect comprised in the sample obtained from an endometrial cancer patient. As an example of the predetermined amount, it may be 1 μg to 1 mg, or 10 μg to 1 mg for endometrial tissue.

As used herein, the term "measured value" is a value indicating the amount of biomarker measured in this step. The measurement value may be an absolute value such as volume or weight, or a relative value such as concentration, ionic strength, absorbance or fluorescence intensity. Further, for example, it may be a value calculated by scoring based on values of, for example, volume and weight.

When the biomarker of the first aspect to be measured is CLDN6 protein or a peptide fragment thereof, the measurement method may be, but is not particularly limited to, a known peptide quantification method which is capable of measuring the amount of CLDN6 protein that is a biomarker. For example, an immunological detection method, an aptamer analysis method, or a mass spectrometry method using a binding molecule capable of specifically binding to a biomarker may be comprised.

The binding molecule include, for example, anti-CLDN6 antibody, anti-CLDN6 antibody fragment having binding activity to CLDN6 protein, CLDN6 binding aptamer, and a primer pair that is capable of binding to the sense strand or antisense strand of CLDN6 mRNA, and specifically amplifying the whole region or a partial region of the mRNA.

Further, when the biomarker of the first aspect to be measured is CLDN6 mRNA or a nucleic acid fragment thereof, the measurement method may be any known nucleic acid quantification method and is not particularly limited. For example, a nucleic acid amplification method, a hybridization method, or an RNase protection method can be comprised. In the present specification, each of the measuring method will be described.

(a) Immunological Detection Method

The "immunological detection method" is a method for quantifying a target molecule using an antibody or an antibody fragment that specifically binds to a target molecule that is an antigen. In the present invention, the target molecule to be measured may comprises the CLDN6 protein or the peptide fragment thereof, the biomarker of the first aspect.

The antibody can be derived from any animal including mammals and birds. For example, it comprises mice, rats, guinea pigs, rabbits, goats, donkeys, sheep, camels, horses, chickens and humans, and the like.

The antibody used in the immunological detection method may be any of a monoclonal antibody, a polyclonal antibody, a recombinant antibody and a synthetic antibody.

As used herein, the term "monoclonal antibody" refers to a single immunoglobulin clone group. Each immunoglobulin constituting the monoclonal antibody has a common framework region (hereinafter referred to as "FR") and a common complementarity determining region (hereinafter referred to as "CDR"), and can recognize and bind to the same epitope of the same antigen. A monoclonal antibody can be obtained from a hybridoma derived from single cell.

A typical immunoglobulin molecule is constituted with as a tetramer in which two pairs are interconnected by disulfide bonds, wherein each pair comprises two polypeptide chains called a heavy chain and a light chain. The heavy chain is consisting of an N-terminal heavy chain variable region (H chain V region: hereinafter referred to as "VH") and a C-terminal heavy chain constant region (H chain C region: hereinafter referred to as "CH"). The light chain is consisting of an N-terminal light chain variable region (L chain V region: hereinafter "VL") and the C-terminal light chain constant region (L chain C region: hereinafter "CL"). VH and VL are particularly important among them in that they are involved in binding specificity of the antibody. Each of these VH and VL has, but is not limited to, about 110 amino acid residues, and has three CDRs (CDR1, CDR2, CDR3) directly involved in the binding specificity with the antigen, and four FRs (FR1, FR2, FR3, FR4) function as the skeletal structure of the variable region. CDR is known to form a three-dimensional structure complementary to an antigen molecule and determine the specificity of the antibody (EA Kabat et al, 1991, Sequences of proteins of immunological interest, Vol. 1, eds. 5, NIH publication). The amino acid sequence of the constant region is almost constant among antibodies in a species, whereas the amino acid sequence of CDR has high variability among the antibodies, and thus is also called a hypervariable region. In the variable region, the CDR and FR are arranged in the order of FR1, CDR1, FR2, CDR2, FR3, CDR3, FR4 in the N-terminal to C-terminal direction. Within the immunoglobulin molecule, VL and VH form an antigen-binding site by forming a dimer facing one another.

In the present specification, a specific example of the monoclonal antibody against CLDN6 comprises, but is not limited to, rat anti-human CLDN6 monoclonal antibody clone "ACLDN6 #C6C15-1 antibody" produced and verified for their antigen specificity and non-cross-reactivity in the Examples of the present specification. The αCLDN6 #C6C15-1 antibody has CDR1 having the amino acid sequence according to SEQ ID NO: 3, CDR2 according to SEQ ID NO: 4, and CDR3 according to SEQ ID NO: 5 in the heavy chain, and has CDR1 having the amino acid sequence according to SEQ ID NO: 7, CDR2. according to SEQ ID NO: 8 and CDR9 according to SEQ ID NO: 9 in the light chain. It also has the heavy chain variable region (HV) having the amino acid sequence according to SEQ ID NO: 6, and the light chain variable region (LV) according to SEQ ID NO: 10.

The term "polyclonal antibody" as used herein refers to a group of plural species of immunoglobulin that recognize and bind to different epitopes of the same antigen. The polyclonal antibody can be obtained from the serum of an animal after immunizing the animal with the target molecule as an antigen.

The term "synthetic antibody" as used herein refers to an antibody synthesized by using a chemical method or a recombinant DNA method. It comprises a monomeric polypeptide molecule, in which one or more VLs and one or more VHs of a specific antibody are artificially linked via linker peptides or the like having an appropriate lengths and sequences, and a multimeric polypeptide thereof. A specific example of such polypeptides comprises a single-chain Fv (scFv: single chain Fragment of variable region) (see Pierce Catalog and Handbook, 1994-1995, Pierce Chemical Co., Rockford, IL) and diabody, triabody, or tetrabody. These antibodies and fragments thereof can be prepared by the methods known to those skilled in the art. In addition, when the subject is a human, a human antibody or a humanized antibody is preferable in avoiding or suppressing the rejection reaction.

"Humanized antibody" is also referred to as a reshaped human antibody, and is a mosaic antibody in which only the CDRs in the V region of a mammal other than human, for example, an anti-human MGAT5B mouse antibody are replaced with CDRs of a suitable human antibody. For example, a recombinant antibody that mimics the properties of a particular antibody can be obtained by preparing a recombinant antibody in which each of the DNA sequences encoding the CDR regions (CDR1 to CDR3) of the heavy and light chains of αCLDN6 #C6C15-1 antibody is replaced with each of the DNA sequences encoding the corresponding CDRs derived from human antibody, and expressing the antibody.

General gene recombination techniques for preparing humanized antibodies are known in the art (EP125023). For example, the method comprises the method of synthesizing a DNA sequence designed to link the CDR of a mouse antibody and the framework region (FR) of a human antibody by a PCR method using several oligonucleotides generated to have a portion overlapping with the terminal regions of both CDR and FR, as a primer. The obtained DNA may be linked to a DNA encoding a human antibody constant region, integrated into an expression vector, and then introduced into a host for expression to obtain a humanized antibody of interest (EP239400, WO96/02576). As the FRs of the human antibody linked via the CDRs, those in which the complementarity determining region forms a favorable antigen-binding site are selected. If necessary, the amino acid in the framework region in the variable region of the antibody may be substituted so that the complementarity determining region of the reshaped human antibody forms an appropriate antigen-binding site (Sato K. et al., Cancer Research, 1993, 53: 851-856). Further, it may be substituted with framework regions derived from various human antibodies (WO99/51743).

A method for producing hybridomas producing polyclonal antibody or monoclonal antibody that recognizes and binds to CLDN6 protein or a peptide fragment thereof may be performed using CLDN6 protein or a peptide fragment thereof as an antigen, according to an antibody production method known in the art. For example, the method described in Kishiro, Y, et al., 1995, Cell Struct Funct, 20 (2): 151-156 may be comprised. A specific example of the anti-CLDN6 monoclonal antibody produced by this method is described in Example 3.

As used herein, the term "antibody fragment" refers to a partial fragment of a polyclonal antibody or a monoclonal antibody, and refers to a polypeptide chain or a complex thereof having an activity substantially equivalent to the antigen-specific binding activity of the antibody. For example, an antibody portion encompassing at least one antigen-binding site, that is, a polypeptide chain having at least one pair of VL and VH, or a complex thereof may be comprised. A specific example comprises a number of well-characterized antibody fragments, or the like generated by cleaving immunoglobulins with various peptidases.

Immunological detection method may be, for example, enzyme immunoassay (including ELISA method and EIA method), fluorescent immunoassay, luminescence immunoassay, radioimmunoassay (RIA), surface plasmon resonance (SPR method), Quartz crystal microbalance (QCM) method, immune nephelometry method, latex agglutination immunoassay method, latex nephelometry, hemagglutination reaction, particle agglutination reaction method, gold colloid method, capillary electrophoresis method, Western blotting method or immunohistochemical method (immunostaining method).

The "enzyme immunoassay" is a method for quantifying a target molecule based on color density and fluorescence intensity in which a primary antibody bound to a target molecule is allowed to generate a coloring substance or a fluorescent substance by the action of an enzyme through a secondary antibody or the like as an enzyme-labeled intervening substance.

"Surface Plasmon Resonance (SPR) method" is a method for detecting and quantifying an adsorbate on the surface of a metal thin film with high sensitivity utilizing a surface plasmon resonance phenomenon in which the reflected light intensity is significantly attenuated at a specific incident angle (resonance angle) when the incident angle of the laser light irradiated on the metal thin film is changed. In the present invention, for example, the target molecule or the target nucleic acid can be detected and quantified from the difference between the measured values before and after the sample being flowed on the surface of a metal thin film, after an antibody against a target molecule, or a nucleic acid probe having a sequence complementary to the nucleotide sequence of the target nucleic acid is fixed on the surface of the metal thin film, and the other portion of the surface is subjected to blocking treatment. Detection and quantification by the surface plasmon resonance method can be performed utilizing, for example, an SPR sensor commercially available from Biacore.

The "Quartz Crystal Microbalance (QCM) method" is a mass measurement method that quantitatively captures an extremely small amount of adsorbate based on the variation of resonance frequency utilizing a phenomenon in which the resonance frequency of the quartz crystal decreases according to the mass of substance which is adsorbed on the surface of an electrode attached to the quartz crystal. The detection and quantification by this method may also be done utilizing a commercially available QCM sensor as in the SPR method. For example, a target molecule or a target nucleic acid can be detected and quantified by the antigen-antibody reaction between the target molecule in the sample and an antibody against the target molecule fixed on the electrode surface, or by base pairing of the target nucleic acid and the nucleic acid probe having a sequence complementary to the target nucleic acid in the sample.

(b) Aptamer Analysis Method

"Aptamer analysis method" is a method for quantifying a target molecule using an aptamer. An aptamer is a ligand molecule having a capacity that strongly and specifically bind to a target substance due to its three-dimensional structure and specifically suppress the function of the target substance. it can be roughly classified into nucleic acid aptamer and peptide aptamer depending on the type of the molecule, and may be any aptamer. A nucleic acid aptamer is preferred. In the present invention, CLDN6 or a peptide fragment thereof, the biomarker according to the first aspect, serves as a target molecule for the aptamer.

"Nucleic acid aptamer" refers to an aptamer constituted with a nucleic acid. The nucleic acid constituting a nucleic acid aptamer may be any of DNA, RNA, or a combination thereof. Chemically modified nucleic acids such as PNA, LNA/BNA, methylphosphonate type DNA, phosphorothioate type DNA, and 2'-O-methyl type RNA may also be comprised, as necessary.

The nucleic acid aptamer can be produced by a method known in the art using the biomarker according to the first aspect as a target molecule. For example, RNA aptamers can be produced by in vitro selection using the SELEX (systematic evolution of ligands by exponential enrichment) method. The SELEX method is a known method, and its specific method may be performed according to, for example, Pan et al. (Proc. Natl. Acad. Sci. 1995, U.S.A. 92: 11509-11513).

A "peptide aptamer" is an aptamer constituted with amino acids, and is a 1-6 kD peptide molecule that recognizes and binds specifically to the surface structure of a specific target molecule as that of an antibody. It can be produced using a phage display method or a cell surface display method. The peptide aptamer may be produced by a method known in the art. For example, reference can be made to Whaley, S. R., et al., 2000, Nature, 405, 665-668.

The antibody or aptamer mentioned above may be labeled as necessary. For labeling, a labeling substance known in the art may be used. An antibody and a peptide aptamer may be, for example, a fluorescent dye (fluorescein, FITC, rhodamine, Texas red, Cy3, Cy5), fluorescent proteins (e.g. PE, APC, GFP), an enzyme (e.g. horseradish peroxidase, alkaline phosphatase, glucose oxidase), a radioisotope (e.g. $^{3}$H, $^{14}$C, $^{35}$S) or biotin or (strept) avidin. A labeling substance for a nucleic acid aptamer may be, for example, a radioisotope (e.g. $^{32}$P, $^{3}$H, $^{14}$C) DIG, biotin, a fluorescent dye (e.g. FITC, Texas, cy3, cy5, cy7, FAM, HEX, VIC, JOE, Rox, TET, Bodipy493, NBD, TAMRA), or a luminescent substance (e.g. acridinium ester). An antibody or an aptamer labeled with a labeling substance can be a useful tool upon detecting an aptamer bound to a target protein.

(c) Mass Spectrometry Method

"Mass Spectrometry" is a method of ionizing a sample under high vacuum and electromagnetically separating the ions to analyze the substance in the sample. When the target molecule to be detected in the sample is apparent, the target molecule being viewed can be detected and quantified by comparing the mass spectrum of the sample with the mass spectrum of the target molecule as a standard. In the present invention, the biomarker CLDN6 or a peptide fragment thereof protein according to the first aspect is correspond to the target molecule.

"Mass spectrometry" includes high performance liquid chromatograph mass spectrometry (LC-MS), high performance liquid chromatograph tandem mass spectrometry (LC-MS/MS), gas chromatograph mass spectrometry (GC-MS), gas chromatograph tandem mass spectrometry (GC-MS/MS), capillary electrophoresis mass spectrometry (CE-MS) and ICP mass spectrometry (ICP-MS).

(d) Nucleic Acid Amplification Method

"Nucleic acid amplification method" refers to a method in which a specific region of a target nucleic acid is amplified by a nucleic acid polymerase using a forward/reverse primer pair. For example, PCR method (including RT-PCR method), NASBA method, ICAN method, LAMP (registered trademark) method (including RT-LAMP method) can be comprised. The PCR method is preferable. The biomarker according to the first aspect used in this method is CLDN6 mRNA or a nucleic acid fragment thereof, and thus is usually a nucleic acid amplification method via a reverse transcription reaction (RT reaction), for example, RT-PCR method or RT-LAMP method is adopted. Particularly, in the present invention, it is preferable to use a quantitative nucleic acid amplification method such as a real-time RT-PCR method because it is necessary to measure the amount of the biomarker according to the first aspect, which is present in a sample such as muscle cells. For the nucleic acid quantification method using the RT-PCR method, kits are commercially available from the above manufacturers, and these kits can also be used. For example, Applied Biosystems TaqMan MicroRNA Assays Kit (Thermo Fisher Scientific) may be comprised.

The reaction conditions for real-time PCR are generally based on the known PCR method, and varies according to the nucleotide length of the nucleic acid fragment to be amplified and the amount of the template nucleic acid, the nucleotide length and Tm value of the primer to be used, and the optimal reaction temperature and the optimum pH of the nucleic acid polymerase to be used, and the like. Therefore, it is appropriately determined according to these conditions. When a kit commercially available from the manufacturer is used, it may be performed according to the protocol attached to the kit.

(e) Hybridization Method

"Hybridization method" is a method for detecting and quantifying a target nucleic acid or a fragment thereof by utilizing the base pairing between the nucleic acid and a probe, using a nucleic acid fragment having a nucleotide sequence complementary to all or part of the nucleotide sequence of the target nucleic acid to be detected as the probe. There are several hybridization methods known with different detection means, but in the present invention, since the target nucleic acid is mRNA, a preferable method may be, for example, Northern hybridization method (Northern blot hybridization method), RNA microarray method, the surface plasmon resonance method or the quartz crystal microbalance method. The surface plasmon resonance method and the quartz crystal microbalance method is as described above.

The "Northern hybridization method" is the most common method for analyzing gene expression, in which RNAs prepared from a sample are separated by electrophoresis on an agarose gel or polyacrylamide gel under denaturing conditions, and transferred to a filter (blotting) to detect the RNA using a probe having a nucleotide sequence specific to the target nucleic acid. By labeling the probe with an appropriate marker such as a fluorescent dye or a radioisotope, and measuring device such a chemiluminescence imaging analyzer (e.g. Light Capture; Atto), a scintillation counter, an imaging analyzer (e.g. FUJIFILM: BAS series) or the like can be used to quantify the target nucleic acid. The Northern hybridization method is a well-known technique in the art, and reference can be made to, for example, Green, M. R. and Sambrook, J., 2012 (mentioned above).

"RNA microarray method" is a method that applies the DNA microarray method to RNA. It is a method in which nucleic acid fragments complementary to all or part of the target nucleic acid is arranged and solidified as a probe at high density and in the form of small spots on the basal plate and a sample containing the target nucleic acid is reacted against it to detect and quantify the nucleic acid hybridized to the spot on the basal plate by fluorescence or the like. Detection and quantification can be achieved by detecting and measuring fluorescence or the like based on hybridization of the target nucleic acid with a microplate reader or scanner. The RNA microarray method is also a technique well known in the art. For example, see "DNA microarray method (DNA microarray and latest PCR method)" (2000) supervised by Masaaki Muramatsu, Hiroyuki Nawa, Shujunsha" and the like.

Each of the measurement methods mentioned above is a technique known in the art. Therefore, a specific measuring method may be performed according to a known method. For example, methods described in Green, M. R. and Sambrook, J., 2012 (mentioned above); Christopher J., et al., 2005, Chemical Review, 105: 1103-1169; Iijima Y. et al., 2008, The Plant Journal, 54, 949-962; Hirai, M. et al., 2004, Proc Natl Acad Sci USA, 101 (27) 10205-10210; Sato S., et al., 2004, The Plant Journal, 40 (1) 151-163; Shimizu M. et al., 2005, Proteomics, 5, 3919-3931 can be referred to.

(2) Determination Step

The "determination step" is a step of determining the quality of the prognosis of the endometrial cancer patient based on the measurement value obtained in the measurement step.

From the results of the study conducted by the present inventors, it has been revealed that CLDN6 protein or CLDN6 mRNA is highly expressed in the collected samples from endometrial cancer patients with a poor prognosis. Therefore, when the amount of CLDN6 protein or the like, or CLDN6 mRNA or the like comprised in the unit amount of the sample is larger than a predetermined value, it is possible to determine that there is high possibility the prognosis of the subject who is an endometrial cancer patient to be poor.

Therefore, in this step, if the measurement value of the amount of the biomarker according to the first aspect obtained in the measurement step is a predetermined value or more, the prognosis of the subject who is the endometrial cancer patient is determined to be poor. On the contrary, if it is smaller than the value, the prognosis of the subject who is the endometrial cancer patient is determined to be good.

As used herein, the "predetermined value" refers to a cutoff value. As used herein, the "cutoff value" refers to a boundary value for classifying the quality of the prognosis of endometrial cancer patients based on the measurement value. The setting of the cutoff value is not particularly limited. For example, by comparing the measured value with the survival rate after 5 years in the postoperative population of endometrial cancer patients, the measurement value can be classified depending on the survival rate percentile, and the percentile value used for the classification is taken as the cutoff value. Specifically, when the quality of the prognosis is classified by the measurement value of the 90th percentile of the population, the 90th percentile becomes the cutoff value.

3. A Kit for Predicting the Prognosis of an Endometrial Cancer Patient

3-1. Overview

A third aspect of the present invention is a kit for predicting the prognosis of an endometrial cancer. The kit of the present invention can analyze a sample obtained from an endometrial cancer patient and easily and accurately predict the quality of the prognosis of the patient's post-operative prognosis without intervention of a doctor.

3-2. Constitution

The kit for predicting the prognosis of endometrial cancer of the present invention comprises a reagent for measuring amount of at least one of the biomarker for predicting the prognosis of endometrial cancer according to the first aspect, as an essential component. A specific example of such reagents comprises, but is not limited to, one or more selected from the group consisting of anti-CLDN6 antibody, anti-CLDN6 antibody fragment having binding activity to CLDN6 protein, CLDN6-binding aptamer, and a primer pair that is capable of binding to a sense strand or an antisense strand of CLDN6 mRNA and specifically amplifying all or part of the mRNA region bound to the sense or antisense strand. These antibodies and aptamers may be bound to a solid phase carrier.

A specific example of the anti-CLDN6 antibody encompassed in the kit for predicting the prognosis of endometrial cancer prognosis of the present invention comprises an anti-CLDN6 monoclonal antibody with CDR1, CDR2, and CDR3 of the heavy chain having the amino acid sequence according to SEQ ID NOs: 3, 4, and 5, respectively, and with CDR1, CDR2, and CDR3 having the amino acid sequence according to SEQ ID NOs: 7, 8, and 9, respectively. For example, it comprises the anti-CLDN6 monoclonal antibody comprising the heavy chain variable region according to SEQ ID NO: 6 and the light chain variable region according to SEQ ID NO: 10. More specifically, it is the αCLDN6 #C6C15-1 antibody.

The kit may also comprise, for example, a labeled secondary antibody, and further, a substrate, a carrier, a washing buffer, a sample diluent, an enzyme substrate, a reaction stop solution necessary for detecting the label, an instruction manual, and the like.

EXAMPLES

«Materials and Methods»

1. Antibodies

Table 1 shows the antibodies used for immunohistochemical staining and their dilution ratios. All are commercially available antibodies, and they are polyclonal antibodies, except for the anti-Actin antibody for internal control.

TABLE 1

| | | | Dilution | | |
|---|---|---|---|---|---|
| Antibody | Type | Host | IHC | WB | Source |
| Claudin-6 | pAb | Rabbit | 1:200 | 1:200 | IBL |
| Actin | mAb | Mouse | | 1:1000 | Sigma-Aldrich |
| Rabbit IgG (HRP) | pAb | Sheep | | 1:5000 | GE Healthcare |
| Mouse IgG (HRP) | pAb | Sheep | | 1:10000 | GE Healthcare | pAb, polyclonal antibody;
mAb, monoclonal antibody;
HRP, horse radish peroxidase In addition to the commercially available antibodies described here, in "9. Preparation of anti-CLDN6 monoclonal antibody" described below, the anti-CLDN6 monoclonal antibody is prepared by ourselves and its usefulness as an antibody for detecting the biomarker for prognosis of an endometrial cancer patient is verified.

2. Collection of Tissue Specimens

Tissue specimens were collected and clinicopathologic factors were analyzed in 141 patients who diagnosed as endometrial cancer and underwent surgery during 2003 to 2010 at the Department of Gynecology, Fukushima Medical University Hospital, and 32 patients who underwent the surgery during 2009 to 2012 at Iwaki Kyoritsu General Hospital. Only those patients whose survival information was known for 5 years from the diagnosis were included as subject cases, and death cases by a disease other than the said disease were excluded. The patient background items of the cases for the present examination are age, surgical progression classification (International Federation of Obstetrics and Gynecology [FIGO2008]), histologic type (endometrioid type, non-endometrioid type), Lymph-vascular space invasion (LVSI). Lymph node metastasis, and distant metastasis, which are shown in Table 2. For the cases from 2003 to 2007, the already diagnosed advanced stage was corrected based on the results of histopathological examination according to the diagnostic criteria of FIGO 2008. The collection of tissue materials was approved by the Fukushima Medical University Ethics Committee (approval number 2536), and was performed in compliance with the ethical guidelines for clinical research.

TABLE 2

| | Total number of patients (n = 173) n (%) | CLDN6 expression | | |
|---|---|---|---|---|
| | | Low (n = 163) n (%) | High (n = 10) n (%) | P-value |
| Parameter | | | | |
| Age (years) | | | | |
| <50 | 32 (18%) | 32 (20%) | 0 (0%) | 0.122 |
| ≥50 | 141 (82%) | 131 (80%) | 10 (100%) | |

TABLE 2-continued

| Parameter | Total number of patients (n = 173) n (%) | CLDN6 expression | | P-value |
|---|---|---|---|---|
| | | Low (n = 163) n (%) | High (n = 10) n (%) | |
| Stage | | | | |
| I/II | 139 (80%) | 136 (83%) | 3 (30%) | <0.001 |
| III/IV | 34 (20%) | 27 (17%) | 7 (70%) | |
| Histological type | | | | |
| Endometrioid | 164 (95%) | 156 (90%) | 8 (80%) | 0.087 |
| Non-endometrioid | 9 (5%) | 7 (10%) | 2 (20%) | |
| Histological grade | | | | |
| 1/2 | 144 (85%) | 140 (87%) | 4 (50%) | 0.015 |
| 3 | 25 (15%) | 21 (13%) | 4 (50%) | |
| LVSI | | | | |
| (−) | 127 (73%) | 124 (77%) | 3 (30%) | 0.001 |
| (+) | 46 (27%) | 39 (23%) | 7 (70%) | |
| LN metastasis | | | | |
| N0 | 145 (85%) | 140 (88%) | 5 (50%) | 0.012 |
| N1 | 25 (15%) | 20 (12%) | 5 (50%) | |
| Distant metastasis | | | | |
| M0 | 163 (94%) | 156 (96%) | 7 (70%) | 0.014 |
| M1 | 10 (6%) | 7 (4%) | 3 (30%) | |

3. Immunohistochemical Staining

All collected endometrial cancer tissues were fixed with 10% formalin, embedded in paraffin, and then subjected to hematoxylin eosin (HE) staining and immunohistochemical staining. The sections were deparaffinized and removal of xylene, and then treated with 0.3% methanol containing hydrogen peroxide at room temperature for 20 minutes to remove endogenous peroxidase. Activation of the antigen was performed by Microwave treatment in pH 6.0 sodium citrate buffer. Blocking was performed with 5% skim milk (#0646869, Morinaga Milk Industry), and anti-claudin-6 rabbit antibody diluted 200-fold with Signal Booster Solution F (#BCL-ISF, Beacle) was reacted overnight at 4° C. The secondary antibody reaction was performed using Histofine SAB-PO Kit (#424031 (R), Nichirei) when the primary antibody was rabbit IgG, and VECTASTAIN Elite ABC Rat IgG Kit (VEC-0761-04, Funakoshi) when it was rat IgG according to the conditions recommended by the manufacturer. After that, the color reaction was performed with 3,3'-Diaminobenzidine (DAB) solution (0.05 M Tris buffer 100 mL, DAB 0.02 g, 30% hydrogen peroxide solution 17 μL) at room temperature for 5 minutes, and then nuclear staining was performed with hematoxylin, and mounted. The observation was performed using an optical phase contrast microscope (OLYMPUS BX61, OLYMPUS), and an image was taken with DP controller (OLYMPUS).

4. Histological Assessment

Masking the patient background such as outcome, two specialists for pathology and one specialist for Obstetrics and gynecology semi-quantified the expression of CLDN6 protein using partially modified Immunoreactive score (IRS; Remmele et al., 1986) method. Specifically, as shown in Table 3, the signal intensity (SI), as staining intensity of CLDN6 protein-positive region in the cell membrane is classified into 4 levels of 0 (negative), 1 (weak), 2 (moderate), and 3 (strong). Furthermore, Percentage of Positive cells (PP), as staining range is determined as either of the 5 levels of 0 (<1%), 1 (1 to 10%), 2 (11 to 30%), 3 (31 to 50%), and 4 (50%<). Using these parameters, the score was calculated as "SI×PP=IRS", then 0 point was set as score 0, 1-2 points were set as score 1, 3-6 points were set as score 2, 8-12 points were set as score 3. Furthermore, IRS score 0/1+ was set as the CLDN6 protein low expression group, and IRS score 2+/3+ was set as the CLDN6 protein high expression group. That is, in this embodiment, the IRS score 2+ corresponds to the cutoff value.

TABLE 3

| Signal intensity (SI) | Percentage of Positive cells (PP) | SI × PP = IRS | CLDN6 expression |
|---|---|---|---|
| 0: negative | 0: <1% | 0: Score 0 | Low |
| 1: weak | 1: 1-10% | 1/2: Score 1+ | |
| 2: moderate | 2: 11-30% | | |
| 3: strong | 3: 31-50% | 3/4/6: Score 2+ | High |
| | 4: >50% | 8/9/12: Score 3+ | |

5. Statistical Analysis

Using the Chi-square test, the association between the clinicopathologic factors listed in Table 2 (patient age, surgical stage classification, histological type, presence of LVSI, presence of lymph node metastasis, presence of distant lymph node metastasis) and high expression of CLDN6 protein was analyzed. Overall survival (OS) was compared between the CLDN6 high expression group and the low expression group using the log rank test. Multivariate analysis was performed by Cox proportional hazards regression analysis. For these statistical analyses, SPSS (registered trademark) Statistics Version 22 (IBM) was used.

6. Cell Culture

In this Example, ECC-1 (gifted from Prof. Gen Yamada of Wakayama Medical University) was used as an endometrial cancer cell line. As a culture solution, 10% Fetal bovine serum (FBS; #172012, Sigma-Aldrich) and 1% Penicillin-streptomycin mixture (#15140-122, Gibco) were added to Roswell Park Memorial Institute (RPMI) 1640.

7. Establishment of CLDN6 Protein Overexpression Strain

The coding region of human CLDN6 gene having the nucleotide sequence according to SEQ ID NO: 2 was cloned at the multiple cloning site (MCS) of the lentiviral vector plasmid CSII-EF-Venus provided by RIKEN BioResource Research Center. This was genetically introduced into HEK293T cells using the lipofection method together with the lentivirus packaging plasmids pCAG-HIVgp and pCMV-VSV-G-RS V-Rev provided by the center, and 3 days later, the culture supernatant containing the lentivirus was added to ECC-1 cells. 5 days later, only Venus positive cells were selected using a cell sorter (FACS Aria II, BD). Further, plural ECC-1: CLDN6 cell clones were established as CLDN6 overexpressing cell lines by the limiting dilution method.

8. Mouse Tumor-Bearing Experiment

Seven 8-week-old female immunodeficient mice (SCID mice; CLEA Japan, Inc.) were used, and $1\times10^7$ ECC-1 cells were dissolved in 500 μL of PBS and subcutaneous transplant was performed subcutaneously on the back. Twenty-eight days after transplantation, the mice were euthanized under anesthesia and dissected. The experiments using mice were approved by the Fukushima Medical University Animal Experiment Committee, and were performed in compliance with the Fukushima Medical University Animal Experiment Regulations.

9. Preparation of Anti-CLDN6 Monoclonal Antibody

A monoclonal antibody against CLDN6 protein (anti-CLDN6 monoclonal antibody) was prepared. The monoclonal antibody was prepared by the following procedure based on the method described in Kishiro Y, et al., 1995, Cell Struct Funct, 20 (2): 151-6.

(1) Preparation of Antigen

First, 2 mg of Imject Maleimide Activated mcKLH (Thermo Fisher Scientific) was dissolved in 200 μL of ultrapure water to prepare a 10 mg/mL KLH solution. Further, the antigen peptide having the amino acid sequence from the 208th position to the 220th position (starting methionine is the 1st position) of the human CLDN6 protein according to SEQ ID NO: 1 was dissolved in PBS to prepare a 5 mg/mL antigen peptide solution. 200 μL of each of the KLH solution and the antigen peptide solution was mixed, and left at room temperature for 2 hours. In order to remove KLH solution-derived EDTA from the mixed solution, the mixture was transferred to a boiled dialysis membrane and dialyzed using PBS as an external solution. The solution obtained was used as an antigen solution. An antigen emulsion was prepared by mixing 400 μL of the antigen solution and 1 mL of Freund's complete adjuvant (Sigma-Aldrich) using a 2 mL Luer lock glass syringe to emulsify.

(2) Immunization

Anesthetized 8-week-old female rats (Wistar strain) were immunized by injecting 100 μL of the antigen emulsion into both hind legs.

(3) Preparation of Polyethylene Glycol (PEG) Solution 5 g of PEG4000 (81240, Sigma-Aldrich) was sterilized by an autoclave. 0.4 mL of dimethylsulfoxide (D2650, Sigma-Aldrich) was added to 8 mL of Dulbecco's modified Eagle medium (high glucose; DMEM; D5796, Sigma-Aldrich), and the mixture was heated to 50° C. PEG4000 after sterilization was added to it and mixed quickly to prepare a PEG solution.

(4) Cell Fusion and Cell Culture

The iliac lymph nodes were removed from the rat 14 days after immunization and placed in a sterile petri dish together with 1 mL of DMEM. The lymph nodes were shredded with scissors and then filtered through a 70 μm cell strainer (BD, Falcon (registered trademark)). About $10^7$ of mouse multiple myeloma cell lines SP2 were added to the petri dish, mixed well with a pipette, centrifuged at 1200 rpm/min for 5 minutes, and the supernatant was removed by suction. The PEG solution at 37° C. was slowly added dropwise over about 1 minute, then left for 2 minutes, and then 9 mL of DMEM medium was slowly added dropwise over 5 minutes. After centrifugation at 900 rpm/min for 5 minutes, the supernatant was removed by suction. 40 mL of hybridoma medium (78% GIT medium [Wako], 2% HAT Supplement [Thermo Fisher Scientific], 10% BM Condimned H1 Hybridoma Cloning Supplement [Roche], 10% fetal bovine serum) was added and 100 μL was seeded on each of four 96-well culture dish, then the cells were cultured in a $CO_2$ incubator at 37° C.

(5) Screening

After 4 days of culture, the medium was exchanged with 100 μL of hybridoma medium. Positive clones were screened by ELISA using 50 μL of the culture supernatant 2 days after the exchange. The screening was performed by the following procedure.

First, the antigen peptide solution was diluted to 3 μg/mL, 100 μL was added to each well of a 96-well ELISA plate, and the mixture was allowed to stand overnight at 37° C. Then, the antigen peptide solution was removed from each well, the wells were washed with 200 μL of PBS, then a blocking solution (1% bovine serum albumin/PBS) was added, and the mixture was allowed to stand at 37° C. for 1 hour. Then, the blocking solution was removed from each well, the wells washed with 200 μL of PBS, 50 μL of culture supernatant was added, and the mixture was reacted at 37° C. for 1 hour. After removing the culture supernatant from each well, the wells were washed 3 times with 200 μL of PBS. Subsequently, 100 μL of a secondary antibody, ECL™ Rat IgG, HRP-linked whole antibody (Sigma-Aldrich) diluted 2,000-fold with a blocking solution was added to each well as a secondary antibody, and reacted at 37° C. for 1 hour. After that, the secondary antibody solution was removed from each well, the wells were washed 3 times with PBS, and then the color was developed using TMB Substrate Set (BioLegend) with the method recommended by the manufacturer, and the absorbance was measured.

24 clones were selected as positive from the screening results. After subculturing these clones in a 12-well culture dish, when the occupied area of cells reached approximately 50%, the clones were transferred to a 10 cm culture dish for further growth.

(6) Immunohistochemistry

Immunohistochemistry was performed for paraffin sections of endometrial cancer tissue derived from a patient by the method described in "2. Collection of tissue specimen" and "3. Immunohistochemical staining" using the 24 positive clones. As a result, one clone (αCLDN6 #C6C15-1) that could stain the section specimen was obtained.

Figure 4:
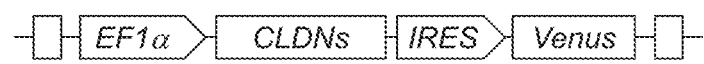
FIG. 4A shows the structure of a claudin expression plasmid vector.
FIG. 4B shows fluorescence diagram of HEK293T cells transfected with various claudin expression plasmid vectors of A.
Figure 4:
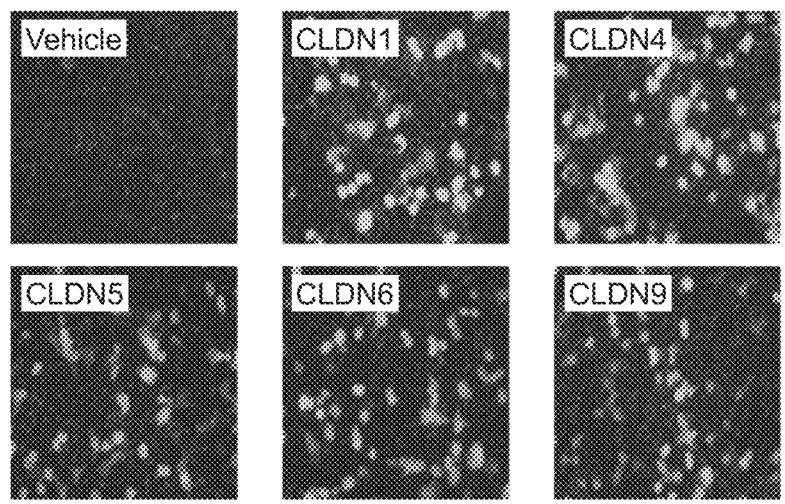

10. Preparation of Claudin (CLDN)—expressing cell sample As shown in FIG. 4, a plasmid vector expressing CLDN gene (each gene encoding CLDN1, CLDN4, CLDN5, CLDN6, and CLDN9) and fluorescent molecule Venus gene under the control of EF1α promoter was prepared and introduced into the HEK293T cell line by a standard protocol using Lipofectamine™ 2000 Transfection Reagent (Thermo Fisher Scientific). As a negative control, a vector expressing only Venus and being without CLDN gene was introduced. 24 hours later, uptake of the expression vector and gene expression were confirmed by observing Venus fluorescence.

11. Western Blot 48 hours after the introduction of each gene, protein was extracted using a lysate in which the proteolytic enzyme inhibitor, Complete mini EDTA-free (Roche Diagnostics) was added to CelLytic™ MT Cell Lysis Reagent (Sigma-Aldrich) at a concentration of 1 cell/10 mL. SDS-PAGE, transcription, and antibody reaction were sequentially performed according to a standard protocol, chemiluminescence was performed by ECL™ Prime Western Blotting Detection reagent (GE Healthcare), and images were taken using CCD imager Image Quant LAS4000 (GE Healthcare). The primary antibody was reacted overnight at 4° C. using a culture supernatant stock solution of αCLDN6 #C6C15-1, and the secondary antibodies were reacted for 30 minutes using ECL™ Rat IgG, HRP-linked whole antibody (Sigma-Aldrich) diluted 2,000-fold with PBS, and ECL™ Rabbit IgG and HRP-linked whole antibody (Sigma-Aldrich) described in Table 1 diluted 5,000-fold with PBS, respectively.

12. CDR Sequencing of Anti-CLDN6 Monoclonal Antibody (αCLDN6 #C6C15-1)

Each variable region and each CDR of light chain and heavy chain of anti-CLDN6 monoclonal antibody clone αCLDN6 #C6C15-1 obtained in "Preparation of anti-CLDN6 monoclonal antibody" above was sequenced. The sequencing was performed by commission sending αCLDN6 #C6C15-1 clone to Bio-Peak. The CDRs were identified according to Kabat's antibody numbering system.

Example 1: Immunohistochemistry of CLDN6 Protein Expression in Endometrial Cancer Tissues CLDN6 protein expression was examined in 173 surgically resected endometrial cancer tissues.

Immunohistochemical staining was performed according to the method described in "3 Immunohistochemical Staining" in the above "Materials and Methods," followed by IRS scoring performed according to the method described in "4. Histological assessment" in the above "Materials and Methods" based on the staining intensity of the CLDN6 protein-positive region in the cell membrane.

FIG. 1 shows the results of immunohistochemical staining with HE and anti-CLDN6 polyclonal antibody. As a result of scoring, 24 of 173 cases (about 14%) were in the CLDN6 protein high expression group (Score 2+/3+). On the other hand, CLDN6 protein low expression group (Score 0/1+) was 149 cases (about 86%). The CLDN6 protein is localized in the cell membrane of endometrial cancer tissue, and CLDN6 positive and negative cancer cell populations were mixed in a mosaic pattern in the tumor even in the high expression group (High CLDN6) (not shown). In the figure, Bar=50 µm.

Figure 2:
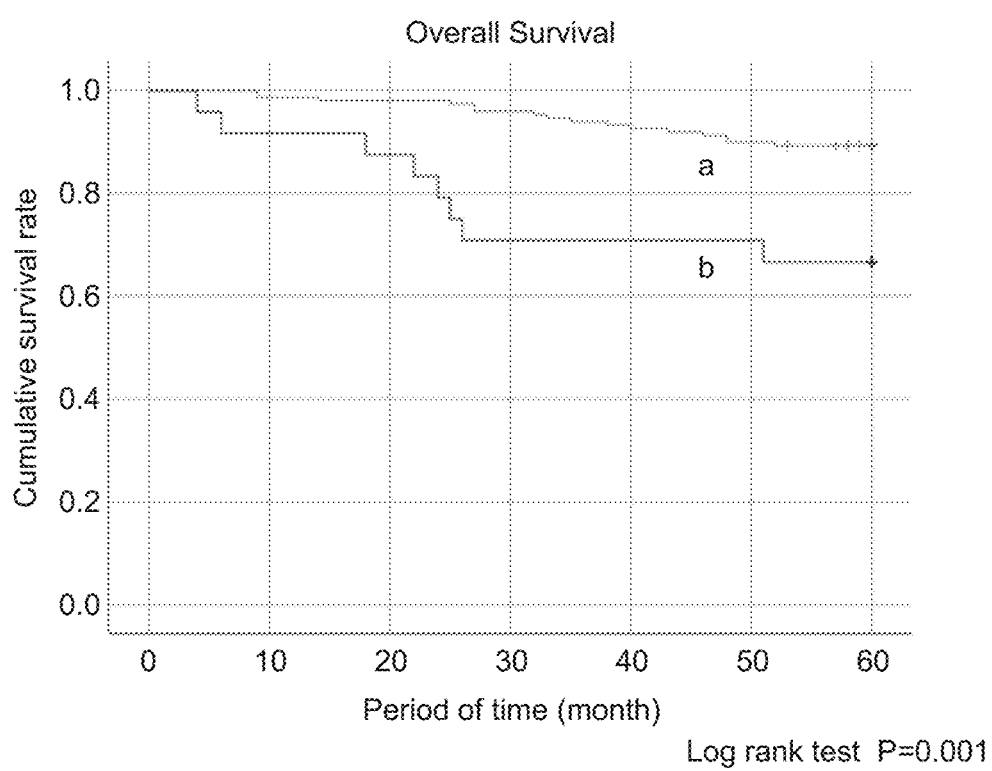
FIG. 2 shows the survival rate of the CLDN6 protein high expression group (a) and the CLDN6 protein low expression group (b) by the Kaplan-Meier curve. *P<0.001.

FIG. 2 is a diagram showing the Kaplan-Meier curve showing the survival rate during 5 years after surgery in each endometrial cancer patient classified as in the CLDN6 protein high expression case (a) and low expression case (b) by the above IRS scoring (* P<0.001). The 5-year survival rate of patients classified into the high expression group based on this cutoff value was 66.7%, which was significantly lower than that of the low expression group of 89.3%. In addition, as shown in Table 4, among clinicopathologic factors, in the surgical progression stage non-endometrioid cancer, tissue grade 3, vascular invasion, lymph node metastasis, and distant metastasis were significantly increased in CLDN6 protein high expression cases. Furthermore, as a result of multivariate analysis, the hazard ratio in the CLDN6 high expression group was 4.13, which was higher than 4.03 in distant metastasis.

TABLE 4

| Variable | HR (95% CI) | P-value |
| --- | --- | --- |
| Age (years) | | |
| ≥50 | 1.21 (0.28, 5.33) | 0.801 |
| Stage | | |
| III/IV | 8.90 (1.81, 43.80) | 0.007 |
| Histological grade | | |
| Grade 3 | 2.64 (0.98, 7.09) | 0.055 |
| LVSI | | |
| (+) | 5.74 (1.35, 24.45) | 0.018 |
| LN metastasis | | |
| (+) | 0.33 (0.09, 1.29) | 0.112 |
| Distant metastasis | | |
| (+) | 3.92 (1.21, 12.67) | 0.023 |
| CLDN6 | | |
| High expression | 4.13 (1.47, 11.56) | 0.007 |

From the above results, it was shown that high expression of CLDN6 protein is a strong poor prognosis factor that exceeds the known poor prognosis factors for endometrial cancer.

Further, when the prognosis is determined to be poor according to the method for predicting the prognosis of endometrial cancer of the present invention, it is expected that the patient has a high risk of recurrence, metastasis or invasion after surgery, and nearly the half of the case may die in 5 years after surgery. Therefore, if it is determined that the prognosis is poor, it is possible to detect recurrence at its early stage by keeping it in mind to routinely perform the prognosis observation and the frequent use test even after the surgery.

Example 2: Proliferation and Invasion Capacity of Endometrial Cancer Cells Due to High Expression of CLDN6 Protein The effect of high expression of CLDN6 protein on malignant phenotype of cancer was examined in vivo by a tumor-bearing experiment using immunodeficient mice.

Figure 3:
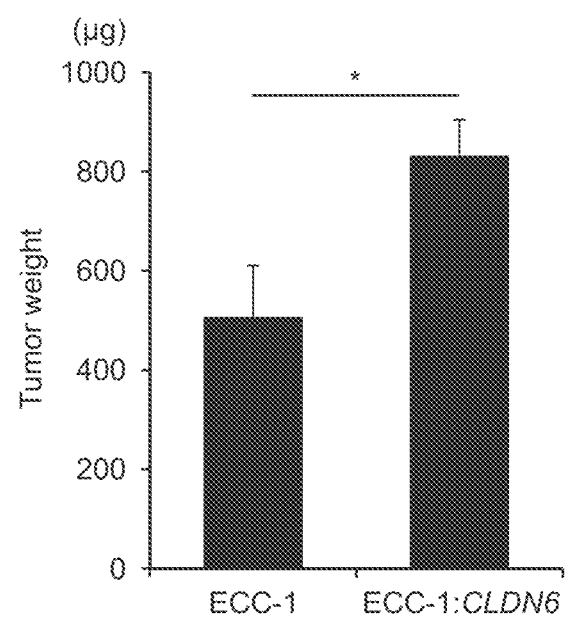
FIG. 3 shows a graph obtained by statistical analysis of the tumor weights of tumor-bearing mice transplanted with ECC-1 cells and ECC-1: CLDN6 cells 4 weeks after the transplantation.

$1 \times 10^7$ of each of wild-type ECC-1 cells and CLDN6 protein overexpression strain ECC-1: CLDN6 cells were transplanted subcutaneously to the back of SCID mice. Tumors were formed in both ECC-1 and ECC-1: CLDN6. Removing cancer tissue 4 weeks later, the transplanted ECC-1: CLDN6 tumor was about 1.6 times larger in tumor weight than that of wild-type ECC-1 (FIG. 3). However, no apparent gross metastasis was observed in lymph nodes or distant organs. On the other hand, all the transplanted tumors showed an image of endometrioid cancer corresponding to Grade 3 with many solid components, and intratumoral heterogeneity of expression of CLDN6 protein was observed in ECC-1: CLDN6 as in the case of human endometrial cancer that highly expresses CLDN6 protein. Invasion into the fibrous capsule around the tumor was conspicuous with ECC-1: CLDN6, and the invasion of both of its CLDN6 protein positive and negative cancer cell populations was observed. In contrast, wild-type ECC-1 showed almost no intracapsular invasion. From the above results, it was revealed that high expression of CLDN6 protein promotes the invasive proliferation capacity of endometrial cancer cells.

Example 3: Antigen Specificity of Anti-CLDN6 Monoclonal Antibody (1)

In order to confirm the antigen specificity and cross-reactivity of the anti-CLDN6 monoclonal antibody (αCLDN6 #C6C15-1) produced in the Examples, Western blotting was performed for CLDN1, CLDN4, CLDN5, CLDN6, and CLDN9 for verification.

Figure 5:
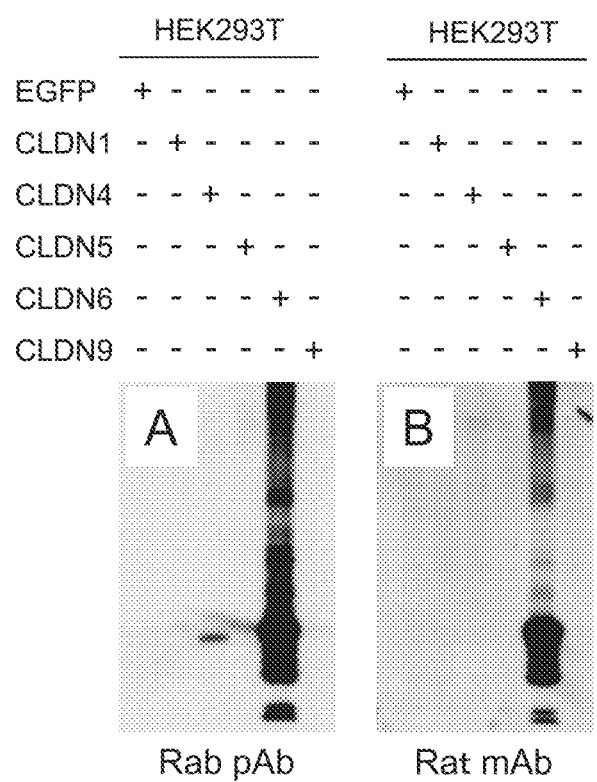
FIG. 5 shows a Western blot diagram showing the antigen specificity and cross-reactivity of anti-CLDN6 antibody. The results are obtained from Western blotting performed for extract from HEK293T cells expressing CLDN1, CLDN4, CLDN5, CLDN6, and CLDN9, respectively, using A: Rabbit anti-CLDN6 polyclonal antibody (IBL), and B: Rat αCLDN6 #C6C15-1 monoclonal antibody produced in Example 3 respectively.

FIG. 5 shows the results. A and B show the result of using Rabbit anti-CLDN6 polyclonal antibody and Rat αCLDN6 #C6C15-1 antibody as primary antibodies, respectively. As is apparent from FIG. 5, the αCLDN6 #C6C15-1 antibody showed an antigen-antibody reaction only against CLDN6 and did not bind to other claudins. From this result, it was proved that the αCLDN6 #C6C15-1 antibody has a high binding specificity for an antigen which is CLDN6 and shows almost no cross-reactivity with other claudin proteins.

Example 4: Antigen Specificity of Anti-CLDN6 Monoclonal Antibody (2)

In order to confirm the antigen specificity and cross-reactivity of the anti-CLDN6 monoclonal antibody (αCLDN6 #C6C15-1) produced in the Examples, CLDN1, CLDN4, CLDN5, CLDN6, and CLDN9 were examined by immunohistochemical staining.

48 hours after gene introduction, HEK293T cells were detached by pipetting and fixed with 10% neutral formalin. Centrifugation was performed at 5,000 rpm/min for 5 minutes to form a cell mass (cell block), which was embedded in paraffin according to a standard protocol and sliced. The basic staining method was in accordance with the above "3. Immunohistochemical staining" After deparaffinization and hydration with PBS, the undiluted solution of the culture supernatant was reacted as a primary antibody overnight at 4° C. or for 1 hour at room temperature. Then, using the VECTASTAIN Elite ABC Rat IgG Kit (Funakoshi), staining was performed by the diaminobenzidine method (DAB staining) according to the standard protocol.

Figure 6:
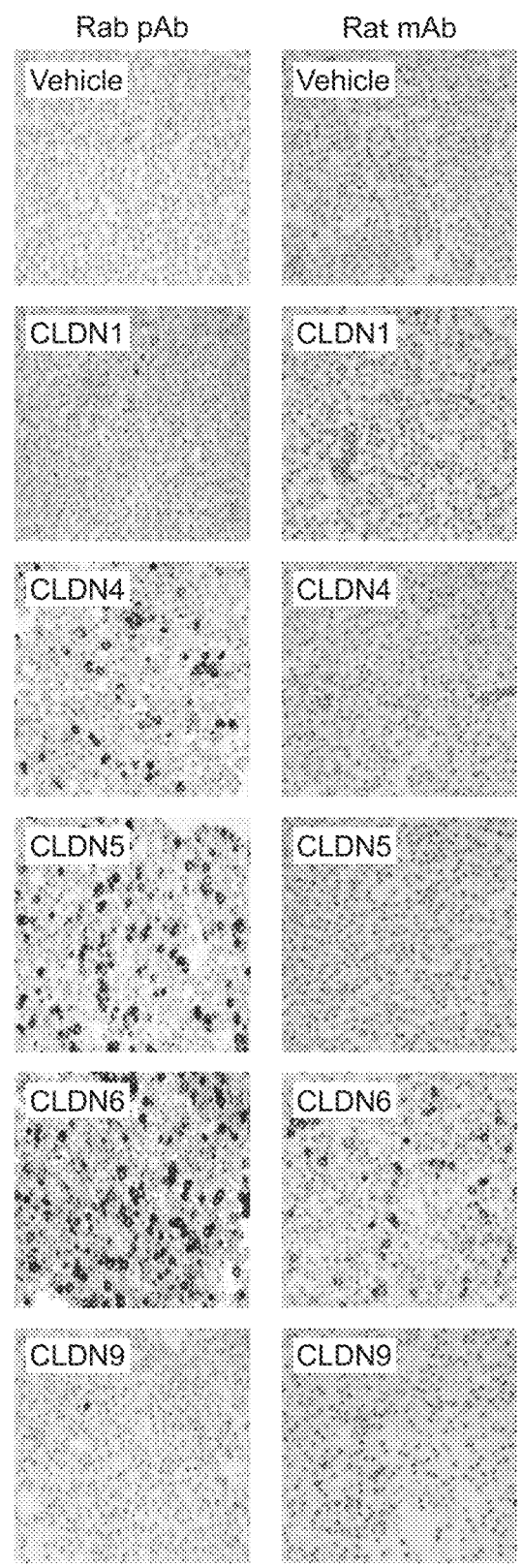
FIG. 6 shows an immunohistochemical staining figure showing the antigen specificity and cross-reactivity of an anti-CLDN6 antibody. The results are obtained from HEK293T cells expressing CLDN1, CLDN4, CLDN5, CLDN6, and CLDN9, respectively, using Rabbit anti-CLDN6 polyclonal antibody (IBL) (the left column), and Rat αCLDN6 #C6C15-1 monoclonal antibody prepared in Example 3 (the left column), respectively.

FIG. 6 shows the results. The left column and the right column show the result of using Rabbit anti-CLDN6 polyclonal antibody (IBL) and Rat αCLDN6 #C6C15-monoclonal 1 antibody produced in Example 3 as primary antibodies, respectively.

As is apparent from FIG. 6, cross-reactivity between CLDN proteins was observed with the Rabbit anti-CLDN6 polyclonal antibody, staining was observed not only with CLDN6 but also with CLDN4 and CLDN5. On the other hand, with the Rat α CLDN6 #C6C15-1 monoclonal antibody, only CLDN6 was stained, and no staining was observed with other CLDNs. From these results, the Rat αCLDN6 #C6C15-1 monoclonal antibody was proven to have high antigen specificity for CDLN6 and non-cross-reactivity with other CLDN proteins.

All publications, patents and patent applications cited herein are hereby incorporated by reference in their entirety.

The invention claimed is:

1. A method for predicting the prognosis of an endometrial cancer patient, comprising:
measuring the amount of a biomarker in a unit amount of a sample of endometrial cancer tissues or endometrial cancer cells obtained from an endometrial cancer patient, so as to obtain the measurement value, and determining the quality of the prognosis of the endometrial cancer patient based on the above,
wherein the determining step comprises determining the prognosis of the endometrial cancer patient to be poor, when the measurement value obtained in the measuring step is equal to or greater than a predetermined value;
wherein the biomarker is
a claudin 6 protein, or
a claudin 6 gene transcription product; and
wherein the amount of the biomarker is measured using an anti-claudin 6 antibody that comprises:
CDR1, CDR2 and CDR3 of the heavy chain having the amino acid sequences according to SEQ ID NOs: 3, 4 and 5, respectively, and
CDR1, CDR2 and CDR3 of the light chain having the amino acid sequences according to SEQ ID NOs: 7, 8 and 9, respectively.

2. The method according to claim 1, wherein the anti-claudin 6 antibody comprises variable regions of the heavy chain and light chain comprising the amino acid sequences according to SEQ ID NOs: 6 and 10, respectively.

3. The method according to claim 1, wherein the claudin 6 protein is (a) or (b):
(a) a protein having the amino acid sequence according to SEQ ID NO: 1;
(b) a protein having an amino acid sequence with 95% or more amino acid identity with respect to the amino acid sequence according to SEQ ID NO: 1.

4. A kit for predicting the prognosis of an endometrial cancer patient, comprising a reagent for measuring the amount of a biomarker for predicting the prognosis of an endometrial cancer patient, wherein the biomarker consists of:
a claudin 6 protein, or
a claudin 6 gene transcription product,
wherein the reagent comprises an anti-claudin 6 antibody; and
wherein the anti-claudin 6 antibody has
CDR1, CDR2 and CDR3 of the heavy chain having an amino acid sequence according to SEQ ID NOs: 3, 4 and 5, respectively, and
CDR1, CDR2 and CDR3 of the light chain having the amino acid sequences according to SEQ ID NOs: 7, 8 and 9, respectively.

5. The kit according to claim 4, wherein the anti-claudin 6 antibody is a monoclonal antibody that has the variable regions of the heavy chain and the light chain comprising the amino acid sequences according to SEQ ID NOs: 6 and 10, respectively.

* * * * *